United States Patent
Terwilliger et al.

(10) Patent No.: US 12,497,918 B2
(45) Date of Patent: Dec. 16, 2025

(54) TURBINE ENGINE WITH INVERSE BRAYTON CYCLE

(71) Applicant: RTX Corporation, Farmington, CT (US)

(72) Inventors: Neil J. Terwilliger, Cheshire, CT (US); Joseph B. Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/591,389

(22) Filed: Feb. 29, 2024

(65) Prior Publication Data
US 2024/0254917 A1  Aug. 1, 2024

Related U.S. Application Data

(62) Division of application No. 17/670,045, filed on Feb. 11, 2022, now Pat. No. 11,939,913.

(51) Int. Cl.
*F02C 6/00* (2006.01)
*F02C 7/08* (2006.01)
*F02C 7/36* (2006.01)

(52) U.S. Cl.
CPC .............. *F02C 6/006* (2013.01); *F02C 7/08* (2013.01); *F02C 7/36* (2013.01); *F05D 2260/10* (2013.01);
(Continued)

(58) Field of Classification Search
CPC .... F02C 6/00; F02C 6/006; F02C 6/18; F02C 7/08; F02C 7/36; F05D 2260/10; F05D 2260/213; F05D 2260/232
See application file for complete search history.

(56) References Cited

U.S. PATENT DOCUMENTS 3,369,361 A  2/1968 Craig
4,086,758 A *  5/1978 Harboe ................. F01K 23/062
60/39.464
(Continued)

FOREIGN PATENT DOCUMENTS

DE  3231561 A1  6/1983
EP  1830052 A1  9/2007
(Continued)

OTHER PUBLICATIONS

EP Search Report for Application No. 23156273.7-1004; Jul. 11, 2023; 6 pages.

*Primary Examiner* — Steven M Sutherland
(74) *Attorney, Agent, or Firm* — CANTOR COLBURN LLP

(57) ABSTRACT

An engine system includes a turbine engine including a compressor section, a combustor section having a burner, a turbine section, and a nozzle in an open-loop configuration. The engine system also includes a bottom-cycle apparatus and an exhaust heat exchanger downstream of the turbine section of the turbine engine configured to reject heat from the turbine engine to the bottoming-cycle apparatus and create a cooled turbine exhaust in the turbine engine. The engine system further includes an exhaust compressor arranged downstream of the exhaust heat exchanger and upstream of the nozzle of the turbine engine configured to compress the cooled turbine exhaust stream and increase a pressure of the cooled turbine exhaust stream prior to exiting the nozzle of the turbine engine.

20 Claims, 7 Drawing Sheets

(52) U.S. Cl.
CPC .. *F05D 2260/213* (2013.01); *F05D 2260/232* (2013.01)

(56) References Cited

U.S. PATENT DOCUMENTS

| | | |
|---|---|---|
| 4,267,692 A | 5/1981 | Earnest |
| 6,212,871 B1 | 4/2001 | Rakhamailov |
| 6,293,086 B1 | 9/2001 | Reynolds |
| 10,934,894 B2 | 3/2021 | Copeland et al. |
| 2004/0103637 A1* | 6/2004 | Maisotsenko ............. F28D 5/02 60/39.59 |
| 2010/0319356 A1* | 12/2010 | Takeda ................ F04D 25/0606 60/773 |
| 2018/0274441 A1 | 9/2018 | Descubes et al. |
| 2020/0056564 A1* | 2/2020 | Bauer ................... B66C 19/007 |
| 2020/0165970 A1* | 5/2020 | Sinatov .................... F25J 1/004 |
| 2020/0224588 A1 | 7/2020 | Somanath et al. |
| 2020/0318498 A1 | 10/2020 | Goodarzi |
| 2023/0258125 A1 | 8/2023 | Terwilliger |

FOREIGN PATENT DOCUMENTS

| | | | |
|---|---|---|---|
| GB | 1557817 A | 12/1979 | |
| WO | WO-2019211775 A1 * | 11/2019 | ........... F01K 23/065 |

* cited by examiner

TURBINE ENGINE WITH INVERSE BRAYTON CYCLE

CROSS-REFERENCE TO RELATED APPLICATIONS

This application is a division of U.S. application Ser. No. 17/670,045 filed Feb. 11, 2022, the disclosure of which is incorporated herein by reference in its entirety.

TECHNICAL FIELD

The present disclosure relates generally to turbine engines and aircraft engines, and more specifically to a turbine engine with an inverse Brayton cycle for an aircraft use.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine. Turbine exhaust gas typically passes through a nozzle and exits the engine with a substantial amount of heat and pressure above ambient atmospheric conditions. Waste heat in the turbine exhaust gas is a source of inefficiency in operating a gas turbine engine.

BRIEF SUMMARY

According to some embodiments, an engine system includes a turbine engine including a compressor section, a combustor section having a burner, a turbine section, and a nozzle in an open-loop configuration. The engine system also includes a bottom-cycle apparatus and an exhaust heat exchanger downstream of the turbine section of the turbine engine configured to reject heat from the turbine engine to the bottoming-cycle apparatus and create a cooled turbine exhaust in the turbine engine. The engine system further includes an exhaust compressor arranged downstream of the exhaust heat exchanger and upstream of the nozzle of the turbine engine configured to compress the cooled turbine exhaust stream and increase a pressure of the cooled turbine exhaust stream prior to exiting the nozzle of the turbine engine.

In addition to one or more of the features described above or below, or as an alternative, embodiments may include where the turbine section is configured to expand the turbine exhaust stream to a first pressure below an inlet pressure of the nozzle.

In addition to one or more of the features described above or below, or as an alternative, embodiments may include where the turbine section is configured to expand the turbine exhaust stream to a second pressure below ambient atmospheric pressure.

In addition to one or more of the features described above or below, or as an alternative, embodiments may include where the exhaust compressor is configured to compress the cooled turbine exhaust stream to a third pressure at or above ambient atmospheric pressure.

In addition to one or more of the features described above or below, or as an alternative, embodiments may include where the bottom-cycle apparatus includes a transfer duct configured to receive heat from the exhaust heat exchanger.

In addition to one or more of the features described above or below, or as an alternative, embodiments may include where the exhaust compressor is mechanically coupled to the turbine section by at least one shaft.

In addition to one or more of the features described above or below, or as an alternative, embodiments may include a motor configured to drive rotation of the exhaust compressor.

In addition to one or more of the features described above or below, or as an alternative, embodiments may include an exhaust turbine coupled to the exhaust compressor, where the exhaust turbine is configured to expand the turbine exhaust stream upstream of the exhaust compressor.

In addition to one or more of the features described above or below, or as an alternative, embodiments may include a transmission system configured to drive rotation of the exhaust compressor based on rotation of a shaft of the bottoming-cycle apparatus.

In addition to one or more of the features described above or below, or as an alternative, embodiments may include where the turbine engine is a topping-cycle machine, and the topping-cycle machine and the bottoming-cycle apparatus operate with an inverse Brayton cycle with respect to the turbine exhaust stream.

In addition to one or more of the features described above or below, or as an alternative, embodiments may include where a fluid of the turbine exhaust stream is different from a bottoming-cycle fluid of the bottoming-cycle apparatus.

According to some embodiments, a method includes transferring heat from a turbine exhaust stream of a turbine engine in an open-loop configuration to an exhaust heat exchanger, the heat transfer resulting in a cooled turbine exhaust stream. Heat is extracted from the exhaust heat exchanger into a bottoming-cycle apparatus. The cooled turbine exhaust stream is compressed to increase a pressure of the cooled turbine exhaust stream prior to exiting a nozzle of the turbine engine.

In addition to one or more of the features described above or below, or as an alternative, embodiments may include expanding the turbine exhaust stream to a first pressure below an inlet pressure of the nozzle.

In addition to one or more of the features described above or below, or as an alternative, embodiments may include expanding the turbine exhaust stream to a second pressure below ambient atmospheric pressure and compressing the cooled turbine exhaust stream to a third pressure at or above ambient atmospheric pressure.

In addition to one or more of the features described above or below, or as an alternative, embodiments may include regulating heat transfer between the turbine engine and the bottoming-cycle apparatus to control one or more operating parameters of the turbine engine or the bottoming-cycle apparatus.

In addition to one or more of the features described above or below, or as an alternative, embodiments may include driving rotation, by a motor, of an exhaust compressor to compress the cooled turbine exhaust stream and controlling an electric power input into the motor to regulate one or more parameters of the gas turbine engine or the bottoming-cycle apparatus.

In addition to one or more of the features described above or below, or as an alternative, embodiments may include expanding the turbine exhaust stream by an exhaust turbine upstream of an exhaust compressor, where the exhaust turbine is coupled to the exhaust compressor.

In addition to one or more of the features described above or below, or as an alternative, embodiments may include where the turbine engine is a topping-cycle machine, and the topping-cycle machine and the bottoming-cycle apparatus operate with an inverse Brayton cycle with respect to the turbine exhaust stream, and a load on either or both of the topping-cycle machine and the bottoming-cycle apparatus is adjustable to control topping and bottoming cycle settings.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
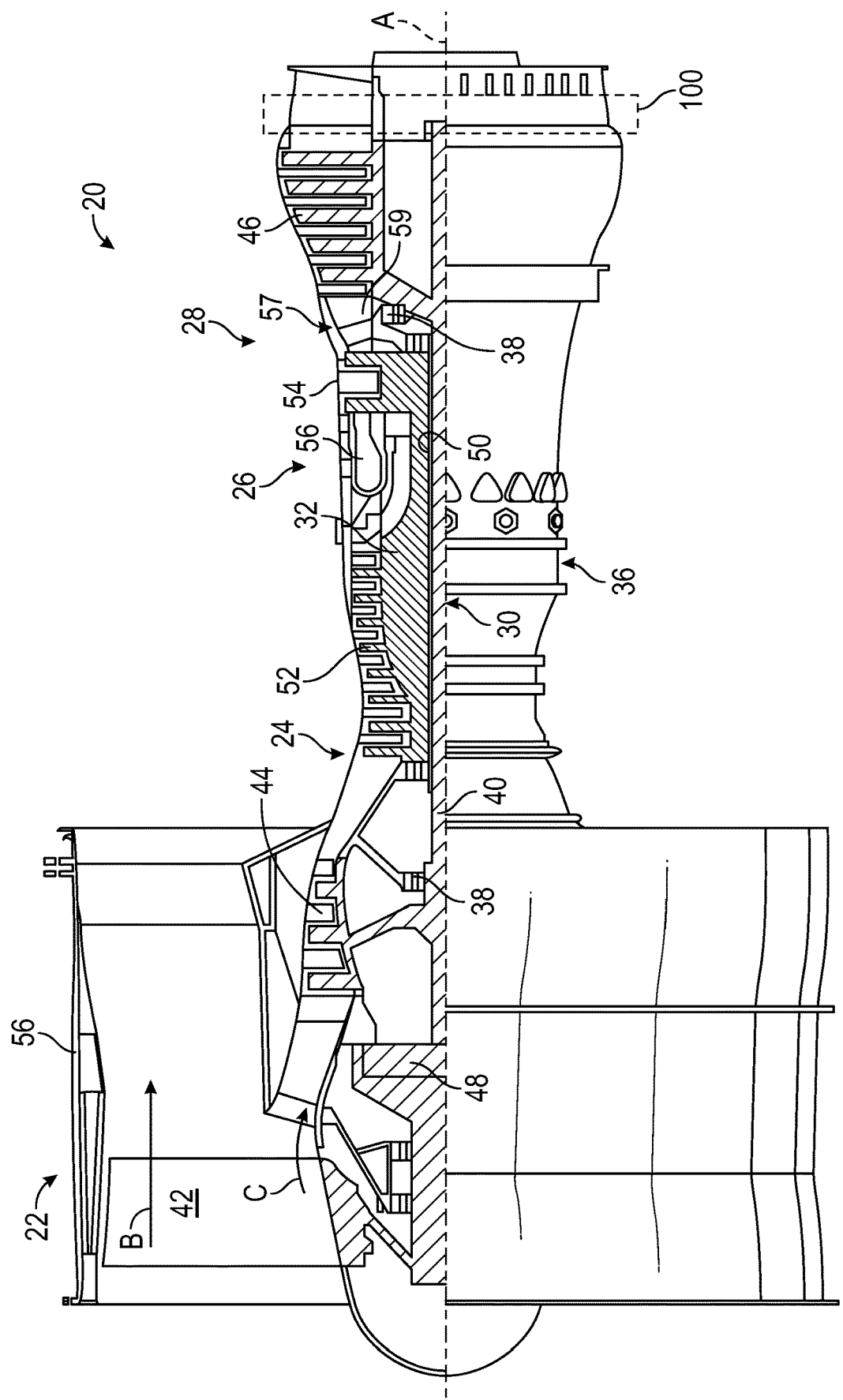
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined in a fan case 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans, turboshafts, or turboprops.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy and can be a large source of inefficiency in gas turbine engines. The gas turbine engine 20 can include a heat energy recovery system 100 with inverse Brayton exhaust. Several examples of the heat energy recovery system 100 are further described herein.

Figure 2:
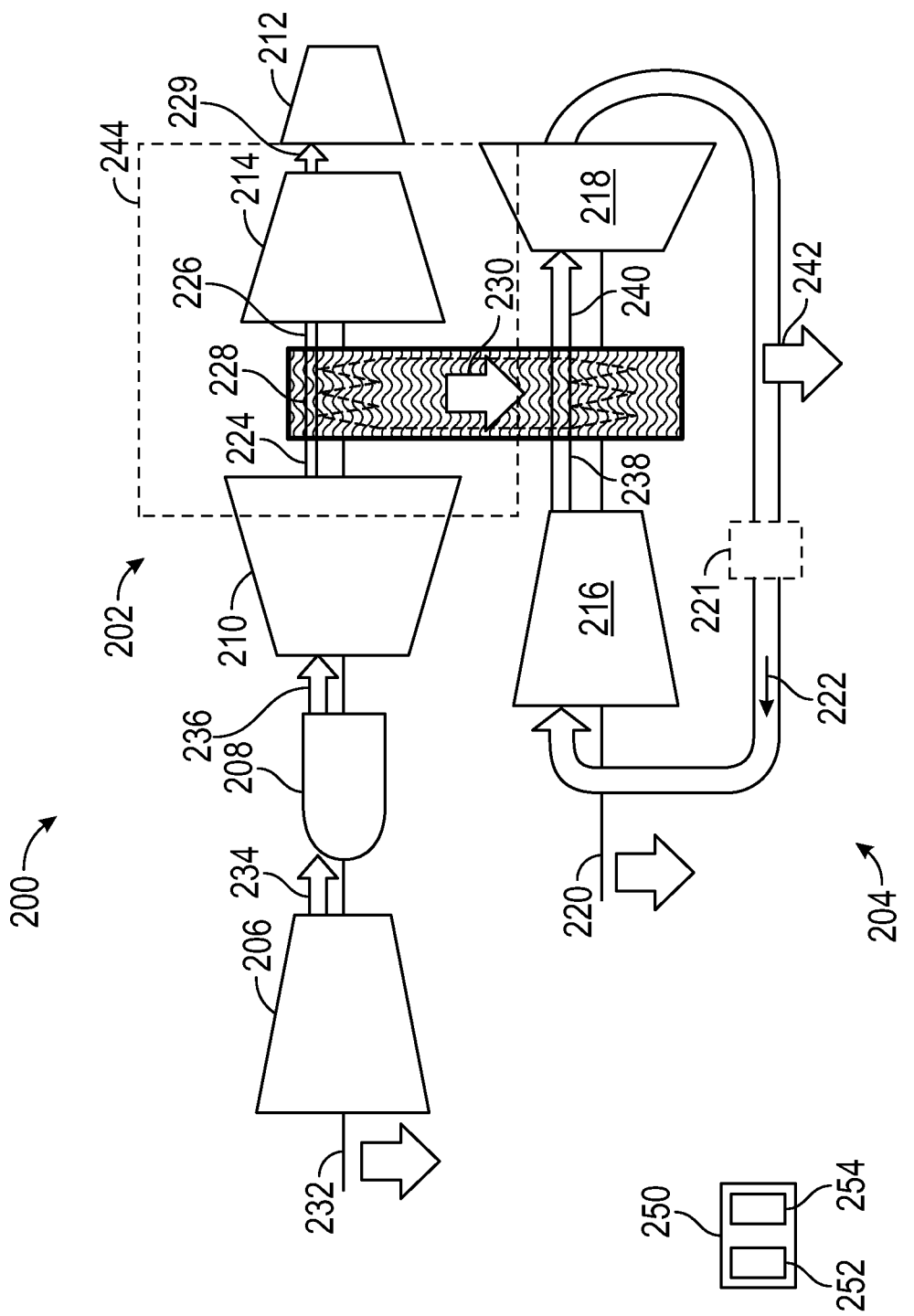
FIG. 2 is a schematic illustration of a turbine engine system in accordance with an embodiment of the present disclosure.

Turning now to FIG. 2, a schematic diagram of a turbine engine system 200 (also referred to as an engine system) in accordance with an embodiment of the present disclosure is shown. The turbine engine system 200 may be similar to that shown and described above in reference to the gas turbine engine 20 of FIG. 1 when the shaft power is configured to drive a fan. The turbine engine system 200 includes a turbine engine 202 and a bottoming-cycle apparatus 204. The core of the turbine engine 202 includes a compressor section 206, a combustor section 208 having a burner, a turbine section 210, and a nozzle 212 in an open-loop configuration. In this example, the open-loop configuration indicates that exhaust gas from the nozzle 212 is not returned as an input fluid for compression by the compressor section 206. The turbine engine 202 can include an exhaust compressor 214 arranged downstream of the turbine section 210 in the open-loop configuration. Although only a single spool is depicted in the example of FIG. 2, it will be understood that the turbine engine 202 can include multiple spools, such as a low spool and a high spool with the exhaust compressor 214 similarly downstream of the various core turbomachinery and spool configurations.

The bottoming-cycle apparatus 204 can include any type of heat engine such as a Brayton cycle, Rankine cycle, organic Rankine cycle, a heat engine without turbomachinery such as a ramjet, the bypass stream of a fan duct, or other types of heat engines known to those skilled in the art. For example, the bottoming-cycle apparatus 204 can include a bottoming-cycle compressor (or pump) 216 and a bottoming-cycle turbine 218 coupled to a shaft 220, where the bottoming-cycle turbine 218 is arranged in a closed-loop configuration to expand a bottoming-cycle fluid 222 and drive power to the shaft 220 after receiving heat 230 transfer from a turbine exhaust stream 224 of the turbine section 210. The extraction of heat 230 from the turbine exhaust stream 224 results in a cooled turbine exhaust stream 226 as an input to the exhaust compressor 214 of the turbine engine 202. The turbine engine system 200 can include an exhaust heat exchanger 228 configured to transfer heat 230 from the turbine exhaust stream 224 to the bottoming-cycle fluid 222 and produce the cooled turbine exhaust stream 226. The turbine section 210 is configured to expand the turbine exhaust stream 224 to a first pressure below inlet pressure of the nozzle 212, or even below ambient atmospheric pressure as an example of a second pressure. The exhaust compressor 214 can be configured to compress the cooled turbine exhaust stream 226 to a third pressure at or above ambient atmospheric pressure as exhaust stream 229 to pass through the nozzle 212 to atmosphere.

The turbine engine 202 can include a shaft 232 configured to power an electric generator or propulsor, such as a fan, propeller, and/or auxiliary components directly or through a geared interface. The shaft 232 can be coupled to one or more components, such as the compressor section 206, the turbine section 210, and the exhaust compressor 214. As such, the exhaust compressor 214 can be mechanically coupled to the turbine section 210 by at least one shaft 232.

In the open-loop configuration, a compressed fluid output 234 of the compressor section 206 can be passed to the combustor section 208, where fuel burn occurs to add heat to the compressed fluid output 234 and provide a compressed and heated fluid 236 to the turbine section 210. The fuel burned in the combustor section 208 can be of various types and need not be limited to hydrocarbon-based fuels. After expansion by the turbine section 210, the exhaust heat exchanger 228 extracts heat from the turbine exhaust stream 224 to produce the cooled turbine exhaust stream 226. The cooled turbine exhaust stream 226 is passed to the exhaust compressor 214 and is further compressed as exhaust stream 229 before exiting through the nozzle 212. This can allow enhanced efficiency as the turbine section 210 can be sized to support an inverse Brayton cycle 244 with respect to the turbine exhaust stream 224 such that expansion by the turbine section 210 can reduce pressure below ambient. The combination of the bottoming-cycle apparatus 204, exhaust compressor 214, and the exhaust heat exchanger 228 is one example of the heat energy recovery system 100 of FIG. 1 with inverse Brayton exhaust.

The bottoming-cycle apparatus 204 in a closed-loop configuration can prevent a diversion of fluid from the turbine exhaust stream 224 to the bottoming-cycle apparatus 204. The exhaust heat exchanger 228 can transfer heat 230 energy from the turbine exhaust stream 224 to the bottoming-cycle apparatus 204 without transferring fluid or may have an intermediate working fluid. The bottoming-cycle compressor 216 can compress the bottoming-cycle fluid 222 as a compressed bottoming-cycle fluid 238. Heat 230 can be transferred to the compressed bottoming-cycle fluid 238 from the exhaust heat exchanger 228 to result in heated compressed bottoming-cycle fluid 240 upstream of the bottoming-cycle turbine 218. After expansion through the bottoming-cycle turbine 218, residual heat 242 can be rejected from the bottoming-cycle fluid 222, for instance, to atmosphere or otherwise used prior to returning the bottoming-cycle fluid 222 as an input of the bottoming-cycle compressor 216 for compression. Work output of the bottoming-cycle turbine 218 can drive rotation of the bottoming-cycle compressor 216 via the shaft 220, and power can be extracted from the shaft 220 for various uses, such as providing rotational power to a generator, a gearbox, returning power to the turbine engine 202, the exhaust compressor 214, or other such uses.

Control of one or more aspects of the turbine engine system 200 can be performed by one or more controllers, such as controller 250. The controller 250 can be a full authority digital engine control that includes processing circuitry 252 and a memory system 254 configured to store a plurality of configuration items, where at least one of the configuration items includes a sequence of the computer executable instructions for execution by the processing circuitry 252. Other types of configuration items stored in the memory system 254 can include but are not limited to data, such as constants, configurable data, models, and/or fault data. Examples of computer executable instructions can include boot software, operating system software, and/or application software. The executable instructions may be stored or organized in any manner and at any level of abstraction, such as in connection with controlling and/or monitoring operation of the turbine engine system 200. The processing circuitry 252 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 254 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The controller 250 can control various aspects of the turbine engine system 200, including power extraction from the shaft 220 and transfer of heat 230. In some embodiments, the controller 250 can control as flow control apparatus 221 of the bottoming-cycle apparatus 204. The flow control apparatus 221 can be a pump or variable geometry interface that increases or reduces flow of the bottoming-cycle fluid 222. The controller 250 can implement control laws or model-based controls to increase or reduce a flow rate and pressure of the bottoming-cycle fluid 222 based on loading/power demand of the shaft 220 and/or alter an aspect of the cooled turbine exhaust stream 226. For example, changing a flow rate of the bottoming-cycle fluid 222 can impact heat transfer upstream of the cooled turbine exhaust stream 226 and thus increase or decrease a temperature of the cooled turbine exhaust stream 226. Thus, the controller 250 can regulate heat transfer between the turbine engine 202 and the bottoming-cycle apparatus 204 to control one or more operating parameters of the turbine engine 202 or the bottoming-cycle apparatus 204. For instance, a load on either or both of the turbine engine 202 as a topping-cycle machine and the bottoming-cycle apparatus 204 can be adjustable to control topping and bottoming cycle settings.

In accordance with embodiments of the present disclosure, the turbine engine system 200 includes components, devices, and systems that are part of an aircraft engine, which may be wing-mounted or fuselage-mounted. Portions of the turbine engine system 200, such as components, devices, and/or systems of the bottoming-cycle apparatus 204 can be located separately from the turbine engine 202, and thus may be arranged within various locations on a wing, within a fuselage, or otherwise located onboard an aircraft. An aircraft can include multiple instances of the turbine engine system 200, such as two, three, four, or more of the turbine engine system 200. The turbine engine system 200 can be incorporated on an aircraft having mixed engine types, such as one or more conventional gas turbine engines installed in combination with one or more of the turbine engine system 200.

As such, in view of the above description, the turbine engine system 200 described with respect to FIG. 2 may be considered part of or components of a main engine core, such as part of the gas turbine engine 20 of FIG. 1. Separate, yet connected, systems can be part of aircraft systems, which are remote from the turbine engine 202. For example, where two or more of the turbine engines 202 are installed in close physical proximity, there may be a shared instance of the bottoming-cycle apparatus 204 that accepts heat from the turbine engines 202.

Figure 3:
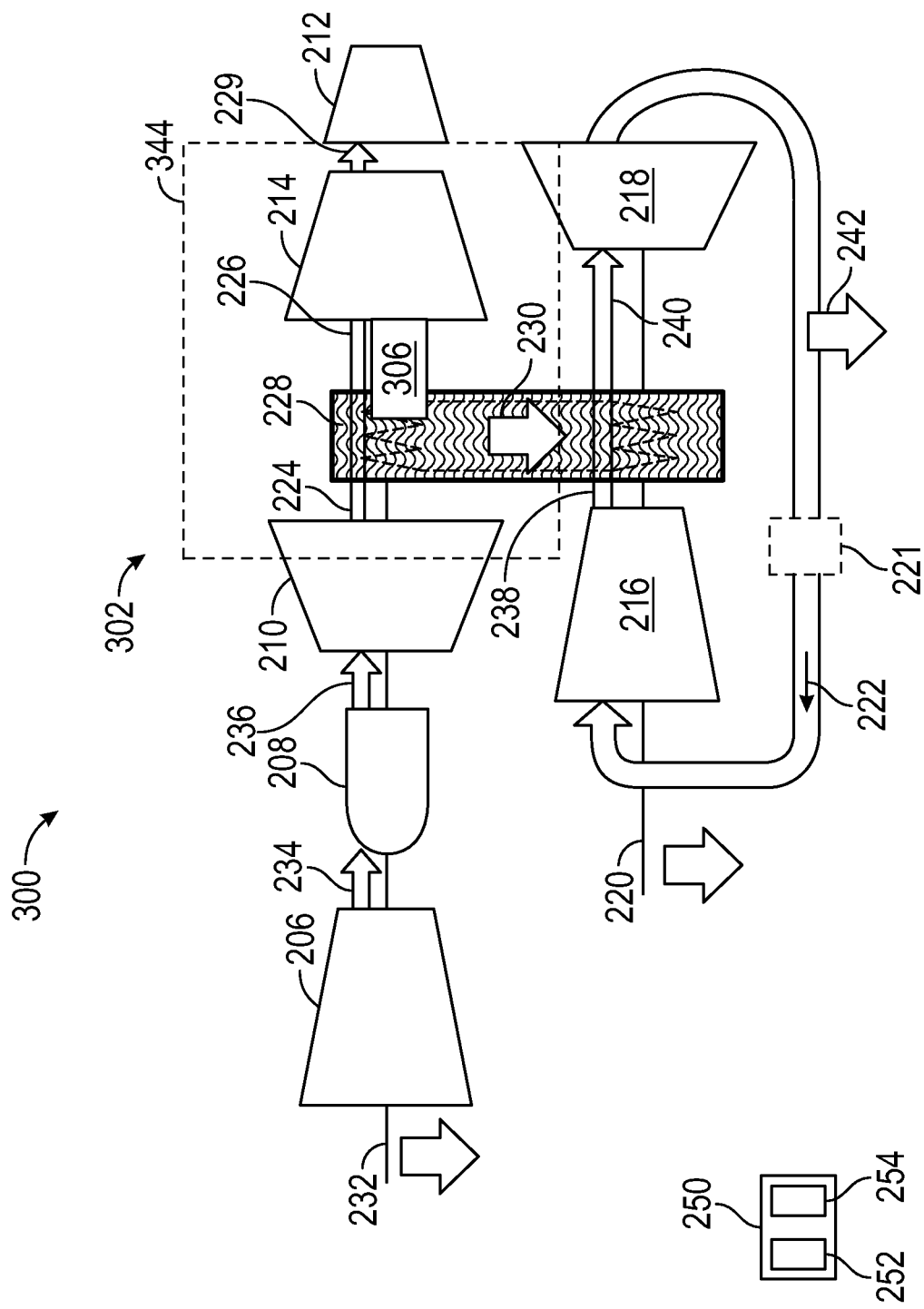
FIG. 3 is a schematic illustration of a turbine engine system in accordance with an embodiment of the present disclosure.

Turning now to FIG. 3, a schematic diagram of a turbine engine system 300 in accordance with an embodiment of the present disclosure is shown. The turbine engine system 300 may be similar to that shown and described above. Similar to the turbine engine system 200 of FIG. 2, the turbine engine system 300 includes a turbine engine 302 and the bottoming-cycle apparatus 204 as previously described with respect to FIG. 2. In FIG. 3, like elements are numbered to align with elements as previously described in FIG. 2. Rather than extending the shaft 232 through the compressor section 206, the combustor section 208, and the turbine section 210 to the exhaust compressor 214, a motor 306 can be configured to drive rotation of the exhaust compressor 214. The controller 250 can control the rotational speed of the exhaust compressor 214 to support a wider dynamic range more independently of the speed of the shaft 232 than may be possible in the example of FIG. 2, where the turbine section 210 and the exhaust compressor 214 are mechanically linked. Controlling the rotational speed of the exhaust compressor 214 can impact the transfer of heat 230 available for the bottoming-cycle apparatus 204 and adjust the pressure of the cooled turbine exhaust stream 226 and exhaust stream 229. The controller 250 can be configured to balance optimizing propulsive efficiency versus sending more power to the shaft 220. The controller 250 may be configured to vary the speed of the exhaust compressor 214 to maintain key parameters of the topping cycle of the turbine engine 302 or/and bottoming-cycle apparatus 204 within desired ranges. The motor 306 can be powered by an electric system that draws power from one or more generators driven by shaft 220 and/or shaft 232. The motor 306 can be powered by energy storage systems such as batteries or capacitors. The motor 306 can be powered by turbines connected to other systems such as bleed air turbines, or fuel turbines. The controller 250 can control an electric power input into the motor 306 to regulate one or more parameters of the turbine engine 302 or the bottoming-cycle apparatus 204.

The turbine section 210, exhaust compressor 214, and motor 306 can be sized to support an inverse Brayton cycle 344 with respect to the turbine exhaust stream 224 such that expansion by the turbine section 210 can reduce pressure below ambient. The combination of the bottoming-cycle apparatus 204, exhaust compressor 214, motor 306, and the exhaust heat exchanger 228 is one example of the heat energy recovery system 100 of FIG. 1 with inverse Brayton exhaust.

Figure 4:
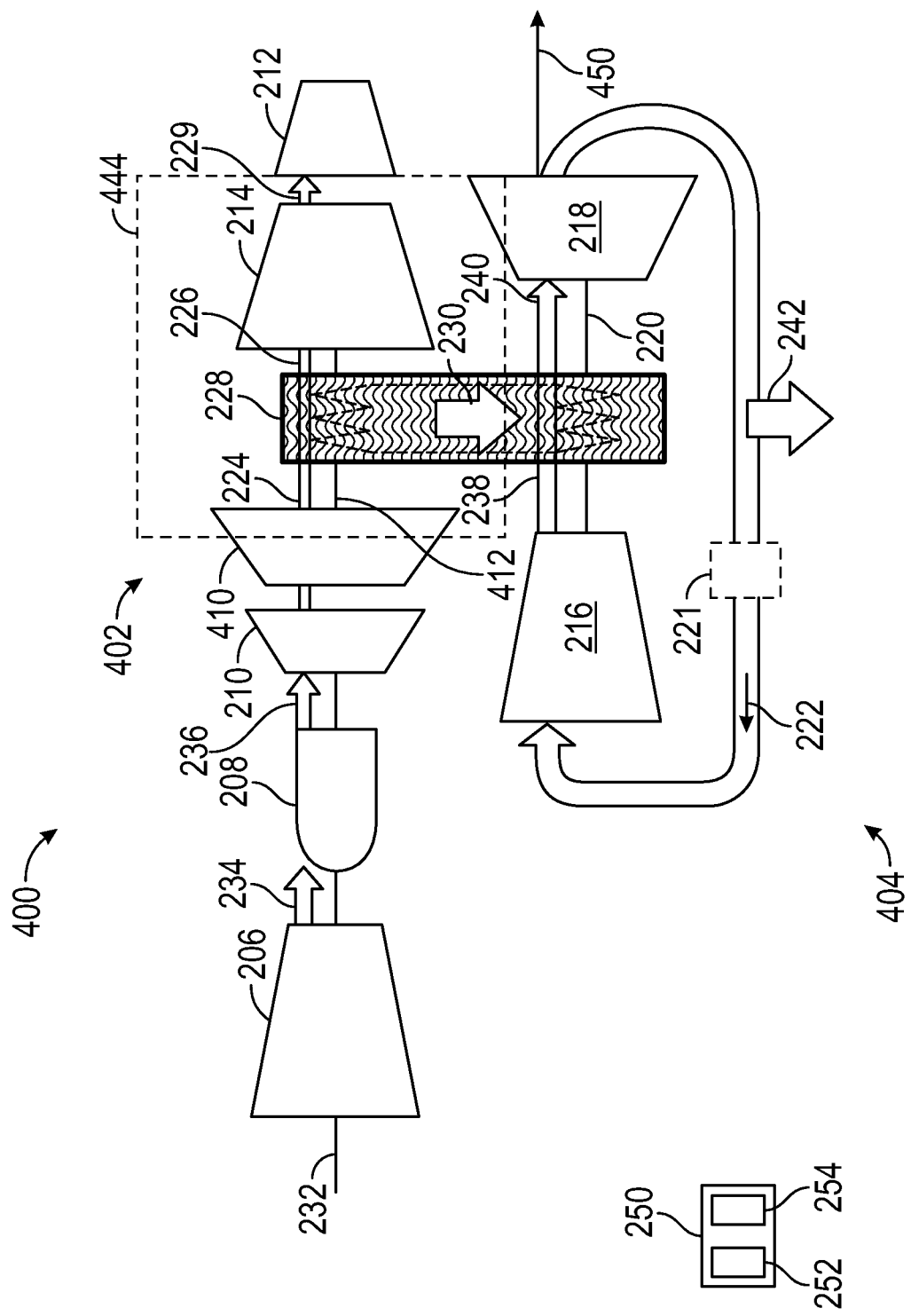
FIG. 4 is a schematic illustration of a turbine engine system in accordance with an embodiment of the present disclosure.

Turning now to FIG. 4, a schematic diagram of a turbine engine system 400 in accordance with an embodiment of the present disclosure is shown. The turbine engine system 400 may be similar to that shown and described above. Similar to the turbine engine system 200 of FIG. 2, the turbine engine system 400 includes a turbine engine 402 and a bottoming-cycle apparatus 404. In FIG. 4, like elements are numbered to align with elements as previously described in FIG. 2. Rather than extending the shaft 232 through the compressor section 206, the combustor section 208, and the turbine section 210 to the exhaust compressor 214, an exhaust turbine 410 is downstream of the turbine section 210 in a free-wheeling configuration with respect to the turbine section 210. The exhaust turbine 410 is coupled by a shaft 412 to the exhaust compressor 214, such that after the compressed and heated fluid 236 is expanded by the turbine section 210, the output fluid of the turbine section 210 becomes the input fluid to the exhaust turbine 410. The exhaust turbine 410 outputs the turbine exhaust stream 224, which is cooled by the exhaust heat exchanger 228 to produce the cooled turbine exhaust stream 226. Further in the example of FIG. 4, similar to the bottoming-cycle apparatus 204 of FIG. 2, the bottoming-cycle apparatus 404 includes the bottoming-cycle compressor 216 that compresses the bottoming-cycle fluid 222 as compressed bottoming-cycle fluid 238. Heat 230 can be transferred to the compressed bottoming-cycle fluid 238 from the exhaust heat exchanger 228 to result in heated compressed bottoming-cycle fluid 240 upstream of the bottoming-cycle turbine 218. The controller 250 may not be able to control the exhaust compressor 214 in the turbine engine system 400 as precisely as in the example of FIG. 3. The controller 250 can adjust the flow of the bottoming-cycle fluid 222 using the flow control apparatus 221. Power output 450 of the bottoming-cycle turbine 218 can be mechanical, thrust, or converted to another form, such as electrical. The controller 250 can adjust the flow of the bottoming-cycle fluid 222 using the flow control apparatus 221 based on the load receiving the power output 450 and/or other factors.

The exhaust turbine 410 and exhaust compressor 214 can be sized to support an inverse Brayton cycle 444 with respect to the turbine exhaust stream 224 such that expansion by the exhaust turbine 410 can reduce pressure below ambient. The combination of the bottoming-cycle apparatus 404, exhaust turbine 410, exhaust compressor 214, and the exhaust heat exchanger 228 is one example of the heat energy recovery system 100 of FIG. 1 with inverse Brayton exhaust.

Figure 5:
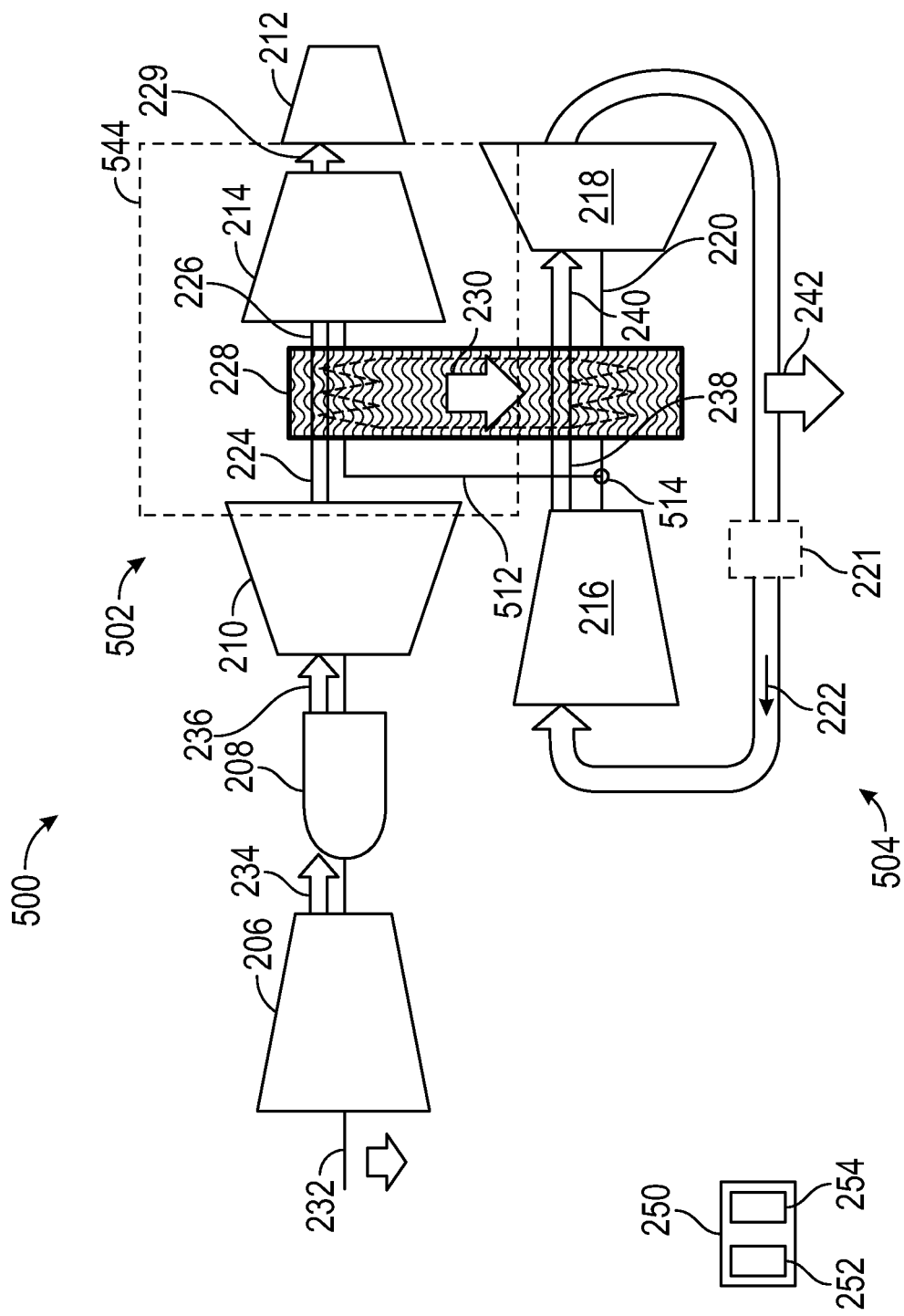
FIG. 5 is a schematic illustration of a turbine engine system in accordance with an embodiment of the present disclosure.

Turning now to FIG. 5, a schematic diagram of a turbine engine system 500 in accordance with an embodiment of the present disclosure is shown. The turbine engine system 500 may be similar to that shown and described above. Similar to the turbine engine system 200 of FIG. 2, the turbine engine system 500 includes a turbine engine 502 and a bottoming-cycle apparatus 504. In FIG. 5, like elements are numbered to align with elements as previously described in FIG. 2. Rather than extending the shaft 232 through the compressor section 206, the combustor section 208, and the turbine section 210 to the exhaust compressor 214, a transmission system 512 is configured to drive rotation of the exhaust compressor 214 based on rotation of the shaft 220 of the bottoming-cycle apparatus 504. A coupling interface 514 can be used to transfer rotational power from the shaft 220 to the transmission system 512 to rotate the exhaust compressor 214. The coupling interface 514 can include a geared interface and may include a clutch to selectively engaged and disengage driving of the exhaust compressor 214 by the bottoming-cycle apparatus 504.

Further in the example of FIG. 5, similar to the bottoming-cycle apparatus 404 of FIG. 4, the bottoming-cycle apparatus 504 includes the bottoming-cycle compressor 216 that compresses the bottoming-cycle fluid 222 as compressed bottoming-cycle fluid 238. Heat 230 can be transferred to the compressed bottoming-cycle fluid 238 from the exhaust heat exchanger 228 to result in heated compressed bottoming-cycle fluid 240 upstream of the bottoming-cycle turbine 218. In contrast to the example of FIG. 4, the shaft 220 coupled to the bottoming-cycle compressor 216 and the bottoming-cycle turbine 218 of the bottoming-cycle apparatus 504 may provide output power to the exhaust compressor 214 as a load. The controller 250 may be able to control engagement, disengagement, and/or gear ratios selected for use by the coupling interface 514 and/or transmission system 512 to control the exhaust compressor 214. Other types of power outputs may also be used in combination with the output power provided to the exhaust compressor 214.

The turbine section 210 and exhaust compressor 214 can be sized to support an inverse Brayton cycle 544 with respect to the turbine exhaust stream 224 such that expansion by the turbine section 210 can reduce pressure below ambient. The combination of the bottoming-cycle apparatus 504, turbine section 210, exhaust compressor 214, and the exhaust heat exchanger 228 is one example of the heat energy recovery system 100 of FIG. 1 with inverse Brayton exhaust.

Figure 6:
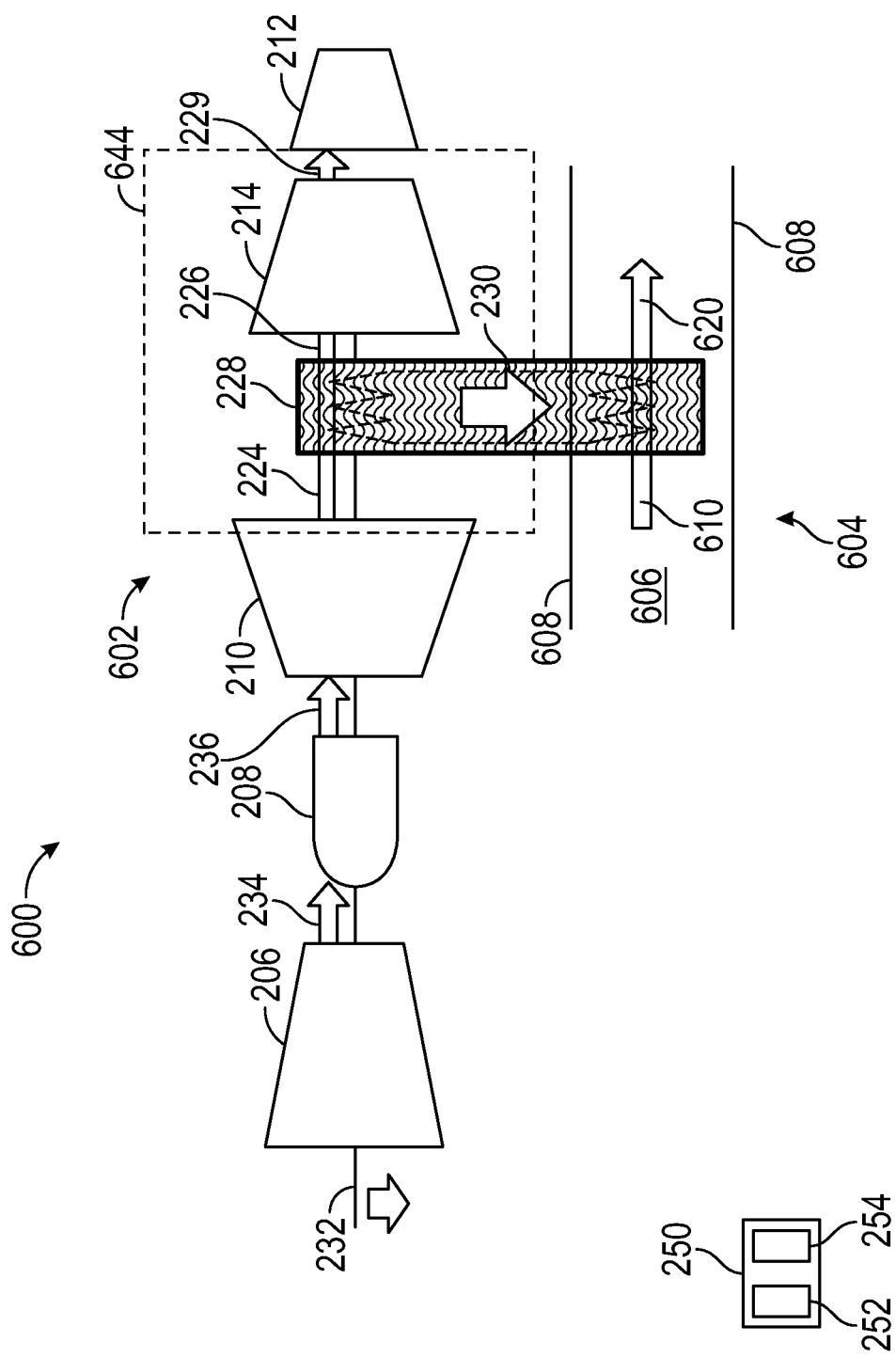
FIG. 6 is a schematic illustration of a turbine engine system in accordance with an embodiment of the present disclosure.

Turning now to FIG. 6, a schematic diagram of a turbine engine system 600 in accordance with an embodiment of the present disclosure is shown. Portions of the turbine engine system 600 may be similar to that shown and described above. Similar to the turbine engine system 200 of FIG. 2, the turbine engine system 600 includes a turbine engine 602 as previously described with respect to FIG. 2. In FIG. 6, like elements are numbered to align with elements as previously described in FIG. 2. The engine system 600 also includes a bottoming-cycle apparatus 604. In the bottom-cycle apparatus 604 can include a transfer duct 606 configured to receive heat 230 from exhaust heat exchanger 228. Duct walls 608 can define a flow path for a bottoming-cycle fluid 610 to receive heat 230, resulting in a heated bottoming-cycle fluid 620. The energy transfer in the form of heat 230 can be used for thrust, such as a ramjet configuration, incorporated in a bypass flow (e.g., from fan 42 of FIG. 1), or other uses. Further, the previously described configurations of turbo machinery, such as the bottoming-cycle compressor 216 and bottoming-cycle turbine 218 can be incorporated in the transfer duct 606 in an open-loop configuration, where power can be extracted from the bottoming-cycle turbine 218, such as rotational power for a generator or other such use. The controller 250 can be used to control operation of the turbine engine system 200.

The turbine section 210 and exhaust compressor 214 can be sized to support an inverse Brayton cycle 644 with respect to the turbine exhaust stream 224 such that expansion by the turbine section 210 can reduce pressure near or below ambient. The combination of the bottoming-cycle apparatus 604, turbine section 210, exhaust compressor 214, and the exhaust heat exchanger 228 is one example of the heat energy recovery system 100 of FIG. 1 with inverse Brayton exhaust.

Figure 7:
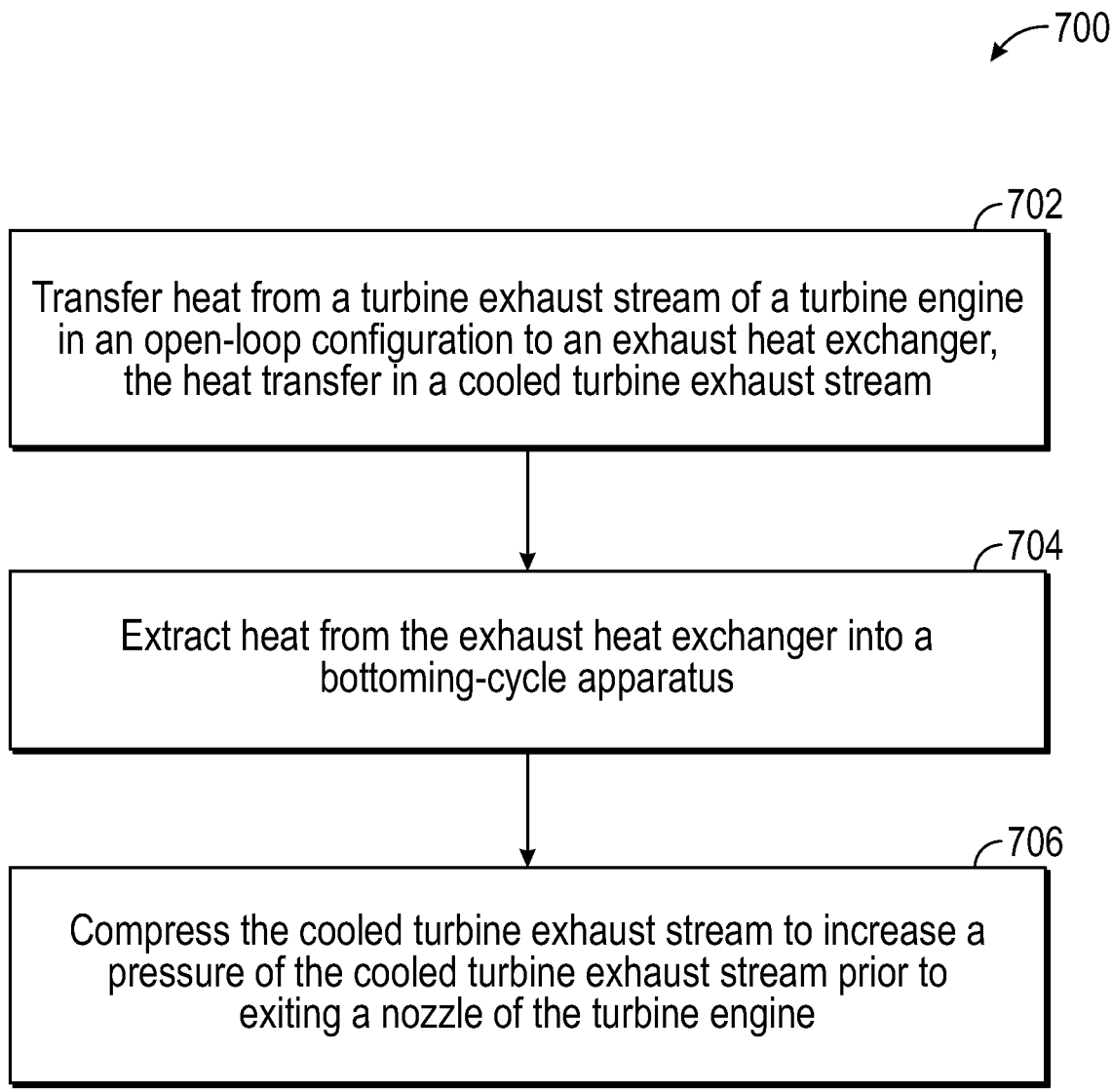
FIG. 7 is a flow chart illustrating a method in accordance with an embodiment of the disclosure.

Referring now to FIG. 7 with continued reference to FIGS. 1-6, FIG. 7 is a flow chart illustrating a method 700 for providing an inverse Brayton cycle in turbine exhaust of a turbine engine for aircraft use in accordance with an embodiment. The method 700 may be performed, for example, in a heat energy recovery system 100 as embodied in the example of turbine engine systems 200, 300, 400, 500, 600, and other such configurations. Further, the method 700 can be performed on engines having a variety of configurations, such as multiple spools, fans, propellers, and other elements, for instance, recuperators.

At block 702, heat 230 is transferred from a turbine exhaust stream 224 of a turbine engine 202, 302, 402, 502, 602 to an exhaust heat exchanger 228, where the heat 230 transfer results in a cooled turbine exhaust stream 226, and where the turbine engine 202, 302, 402, 502, 602 operates in an open-loop configuration. At block 704, heat 230 from the exhaust heat exchanger 228 is extracted into a bottoming-cycle apparatus 204, 304, 404, 504, 604. The exhaust heat exchanger 228 can be in thermal communication with the turbine exhaust stream 224 and a bottoming-cycle fluid 222, 610. The turbine engine 202, 302, 402, 502 of the turbine engine systems 200, 300, 400, 500, 600 can be a topping-cycle machine, and the topping-cycle machine and the bottoming-cycle apparatus 204, 304, 404, 504, 604 can operate with an inverse Brayton cycle with respect to the turbine exhaust stream 224. A fluid of the turbine exhaust stream 224 can be different from the bottoming-cycle fluid 222. For example, the fluid of the turbine exhaust stream 224 and the bottoming-cycle fluid 222 can be isolated from each other such that there is no fluid coupling between the fluids. As such, different fluid types can be used for the turbine exhaust stream 224 and the bottoming-cycle fluid 222, such as using air and $CO_2$.

In some embodiments, shaft power from the bottoming-cycle apparatus 204, 304, 404, 504 is extracted. Power extracted can be used to drive rotation of the bottoming-cycle compressor 216 and may also be used to power other loads. The bottoming-cycle apparatus 204, 304, 404, 504 can be driven by a bottoming-cycle turbine 218 configured to expand a bottoming-cycle fluid 222 after receiving heat 230 transferred from the turbine exhaust stream 224. As another alternative, heat 230 added to the bottoming-cycle fluid 610 of bottoming-cycle apparatus 604 can be used to produce thrust or other such outputs.

At block 706, the cooled turbine exhaust stream 226 is compressed to increase a pressure of the cooled turbine exhaust stream 226 prior to exiting a nozzle 212 of the turbine engine 202, 302, 402, 502, 602. The turbine exhaust stream 224 can be expanded to a first pressure below an inlet pressure of the nozzle 212 and/or to a second pressure below ambient atmospheric pressure. The cooled turbine exhaust stream 226 can be compressed to a third pressure at or above ambient atmospheric pressure.

An exhaust compressor 214 can be driven by various sources as depicted in the examples of FIGS. 2-6. As one example, the cooled turbine exhaust stream 226 can be compressed by the exhaust compressor 214, where the exhaust compressor 214 is mechanically coupled to the turbine section 210 by at least one shaft 232 of the turbine engine 202. As another example, a motor 306 can drive rotation of the exhaust compressor 214 to compress the cooled turbine exhaust stream 226. As a further example, an exhaust turbine 410 can be coupled to the exhaust compressor 214, where the turbine exhaust stream 224 is expanded by the exhaust turbine 410 upstream of the exhaust compressor 214. As another example, rotation of the exhaust compressor 214 can be driven through a transmission system 512 to compress the cooled turbine exhaust stream 226 based on rotation of the shaft 220 of the bottoming-cycle apparatus 504.

The controller 250 can regulate aspects of implementing the method 700. For example, the controller 250 can regulate heat transfer between the turbine engine 202, 302, 402, 502, 602 and the bottoming-cycle apparatus 204, 304, 404, 504, 604 to control one or more operating parameters of the turbine engine or the bottoming-cycle apparatus. In some embodiments, the controller 250 can control an electric power input into the motor 306 to regulate one or more parameters of the turbine engine 302 or the bottoming-cycle apparatus 304. Further, a load on either or both of the topping-cycle machine and the bottoming-cycle apparatus can be adjustable to control topping and bottoming cycle settings.

While the above description has described the flow process of FIG. 7 in a particular order, it should be appreciated that unless otherwise specifically required in the attached claims that the ordering of the steps may be varied.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. An engine system of an aircraft, the engine system comprising:
    a turbine engine comprising a compressor section, a combustor section having a burner, a turbine section, and a nozzle in an open-loop configuration configured to produce thrust for the aircraft, wherein the compressor section and the turbine section are mechanically coupled by a first shaft;
    a bottoming-cycle apparatus;
    an exhaust heat exchanger downstream of the turbine section of the turbine engine configured to reject heat from the turbine engine to the bottoming-cycle apparatus and create a cooled turbine exhaust stream in the turbine engine from a turbine exhaust stream of the turbine section;
    an exhaust compressor arranged downstream of the exhaust heat exchanger and upstream of an inlet of the nozzle of the turbine engine configured to compress the cooled turbine exhaust stream and increase a pressure of the cooled turbine exhaust stream prior to exiting the nozzle of the turbine engine;

a motor configured to drive rotation of the exhaust compressor; and a controller configured to control an electric power input into the motor to regulate one or more parameters of the turbine engine or the bottoming-cycle apparatus.

2. The engine system of claim 1, wherein the turbine section is configured to expand the turbine exhaust stream to a first pressure below an inlet pressure of the nozzle.

3. The engine system of claim 1, wherein the turbine section is configured to expand the turbine exhaust stream to a second pressure below ambient atmospheric pressure.

4. The engine system of claim 3, wherein the exhaust compressor is configured to compress the cooled turbine exhaust stream to a third pressure at or above ambient atmospheric pressure.

5. The engine system of claim 1, wherein the bottoming-cycle apparatus comprises a transfer duct configured to receive heat from the exhaust heat exchanger.

6. The engine system of claim 1, wherein the turbine engine is a topping-cycle machine.

7. The engine system of claim 6, wherein the topping-cycle machine operates with an inverse Brayton cycle with respect to the heat rejected from the turbine exhaust stream of the topping cycle machine to the bottoming cycle machine.

8. The engine system of claim 1, wherein a fluid of the turbine exhaust stream is different from a bottoming-cycle fluid of the bottoming-cycle apparatus.

9. The engine system of claim 1, wherein the bottoming-cycle apparatus comprises a bottoming-cycle compressor and a bottoming-cycle turbine coupled to a second shaft independent of the first shaft.

10. The engine system of claim 9, wherein the bottoming-cycle turbine is arranged in a closed-loop configuration to expand a bottoming-cycle fluid and drive power to the second shaft after receiving heat transfer from the cooled turbine exhaust stream.

11. A method comprising:

transferring heat from a turbine exhaust stream of a turbine engine of an aircraft in an open-loop configuration to an exhaust heat exchanger, the heat transfer resulting in a cooled turbine exhaust stream, wherein the turbine engine comprises a compressor section, a combustor section having a burner, a turbine section, and a nozzle in the open-loop configuration configured to produce thrust for the aircraft, wherein the compressor section and the turbine section are mechanically coupled by a first shaft;

extracting heat from the exhaust heat exchanger into a bottoming-cycle apparatus;

driving rotation, by a motor, of an exhaust compressor to compress the cooled turbine exhaust stream, wherein the exhaust compressor is upstream of an inlet of the nozzle;

controlling, by a controller, an electric power input into the motor to regulate one or more parameters of the turbine engine or the bottoming-cycle apparatus; and compressing the cooled turbine exhaust stream to increase a pressure of the cooled turbine exhaust stream prior to exiting the nozzle of the turbine engine.

12. The method of claim 11, further comprising expanding the turbine exhaust stream to a first pressure below an inlet pressure of the nozzle.

13. The method of claim 11, further comprising:

expanding the turbine exhaust stream to a second pressure below ambient atmospheric pressure.

14. The method of claim 13, further comprising:

compressing the cooled turbine exhaust stream to a third pressure at or above ambient atmospheric pressure.

15. The method of claim 11, further comprising:

regulating heat transfer between the turbine engine and the bottoming-cycle apparatus to control one or more operating parameters of the turbine engine or the bottoming-cycle apparatus.

16. The method of claim 11, further comprising:

controlling an electric power input into the motor to regulate one or more parameters of the turbine engine or the bottoming-cycle apparatus.

17. The method of claim 11, wherein the turbine engine is a topping-cycle machine, wherein the topping-cycle machine operates with an inverse Brayton cycle with respect to the heat rejected from the turbine exhaust stream of the topping cycle machine to the bottoming cycle machine.

18. The method of claim 11, wherein a fluid of the turbine exhaust stream is different from a bottoming-cycle fluid of the bottoming-cycle apparatus.

19. The method of claim 11, wherein the bottoming-cycle apparatus comprises a bottoming-cycle compressor and a bottoming-cycle turbine coupled to a second shaft independent of the first shaft.

20. The method of claim 19, wherein the bottoming-cycle turbine is arranged in a closed-loop configuration to expand a bottoming-cycle fluid and drive power to the second shaft after receiving heat transfer from the cooled turbine exhaust stream.

* * * * *